Jan. 3, 1928.
J. A. STEVENS
SHOCK ABSORBER
Filed Oct. 25, 1926
1,655,209
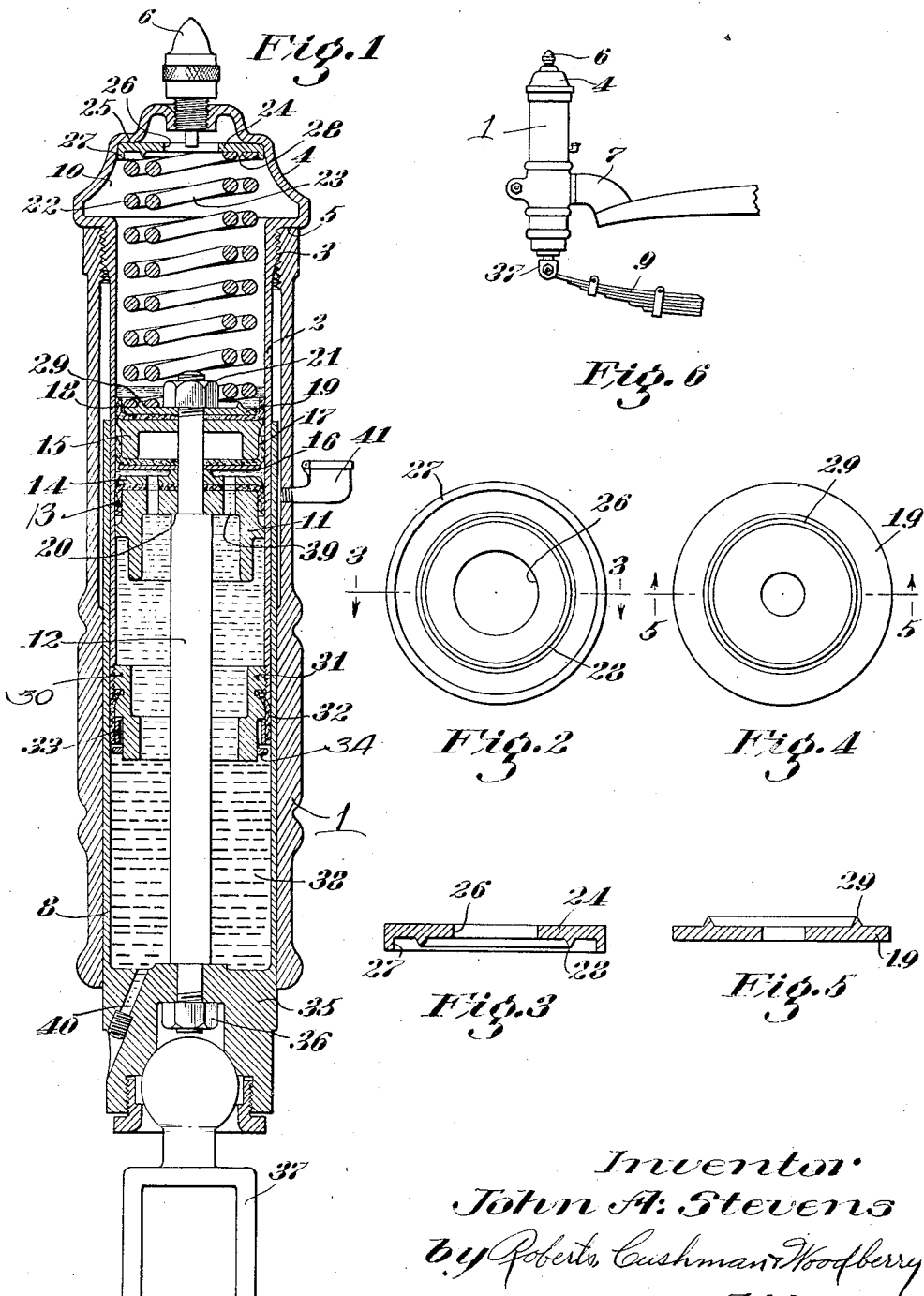

Patented Jan. 3, 1928.

1,655,209

UNITED STATES PATENT OFFICE.

JOHN A. STEVENS, OF LOWELL, MASSACHUSETTS, ASSIGNOR TO STEVENS PRODUCTS COMPANY, OF LOWELL, MASSACHUSETTS, A CORPORATION OF DELAWARE.

SHOCK ABSORBER.

Application filed October 25, 1926. Serial No. 143,831.

The present invention relates to shock absorbers for motor vehicles and more particularly to a form of shock absorber which is particularly adapted for buses, trucks and other heavy vehicles, although it may be used in other relations or for other uses for which it is adapted.

The load conditions on certain types of vehicles are peculiarly subject to fluctuation, such as double-decked motor buses for example, which frequently make runs, particularly during rush hours, with few or no passengers going in one direction and filled to capacity in going in the opposite direction. It is obviously impossible to inflate shock absorbers before each run to attain the proper inflation or adjustment to carry the particular load, or to vary the inflation during a run so as to attain the optimum set under the varying load conditions. It is ncessary for the operator therefore to make a choice as to the pneumatic inflation or pressure to be carried by the shock absorbers on the vehicle. If the absorbers are inflated so as to be adjusted to handle the heaviest load, then in carrying light loads the absorbers are practically inoperative, or at least ineffective, whereas if adjustment is made so as to properly handle the light loads, the absorbers are unable to compensate for sudden jars or shocks when carrying a heavy load. The adjustment which is generally made is one which will properly carry the heavy loads, but the amount of inflation which is suitable for this purpose results in serious jars for light loads, and it is a common experience on buses when they are nearly empty to feel a continuous annoying rattle or vibration, the shock absorbers being ineffective to the extent of causing discomfort. The improvement which constitutes my invention is particularly designed to overcome this defect, so that the device may be adjusted for the maximum load conditions to be encountered, and to provide at the same time for a delicate cushioning effect on light loads, without the necessity of making further adjustments.

Various forms of shock absorbers which are now in common use employ the principle of pneumatic cushioning by means of a piston-cylinder unit containing air under pressure, the air acting through compression to cushion the movements of the vehicle in passing over rough places. Various types of these pneumatically operated shock absorbers employ also an oil, such as a heavy lubricating oil, for example, which serves to lubricate the moving parts of the device, and to effect a snubbing or cushioning action on the return stroke of the piston, and also to assist in retaining the air in the shock absorber, by serving as a liquid seal to prevent leakage of air at one end of the device. Such devices are, in general, satisfactory in operation when the proper air pressure is employed to carry a particular load, but it is generally impossible to maintain the proper degree of inflation because of varying loads, and moreover it has been found that leakage of air invariably occurs in such devices. Because of the danger of leakage it is in general necessary to frequently pump up the devices and to maintain a constant watch in order to ascertain whether they are operating satisfactorily. It happens occasionally that the air in a shock absorber leaks out entirely before it is noticed by the operator of the vehicle, and in such cases the vehicle is subjected to more jolting and to very much greater stresses than would occur if there were no shock absorbers on the vehicle because of the recoil or oscillating effect produced by the shock absorber itself under these conditions.

I have found that by the use of spring members mounted in a pneumatic shock absorber so as to carry a relatively small part of the weight under normal loads and a relatively greater proportion of the weight under heavier loads, the absorbers provide a satisfactory operation under substantially all conditions and moreover, the danger from use of absorbers when the compressed air has leaked out is substantially obviated.

One of the objects of my invention is to provide means whereby the operation of a shock absorber under normal conditions of operation may be improved.

Another object of my invention is to provide an improved form of shock absorber which is operative to delicately cushion the movements of a vehicle under light loads and which is also operative to adequately cushion the vehicle movements under the heaviest and intermediate loads.

Another object of the invention is to provide an improved form of shock absorber which is adapted to suitably cushion the movements of a vehicle without the use of high pneumatic pressure, and in which auxiliary means are provided for assisting in the carrying of light loads, which are operative to carry a proportionately greater part of loads weighing more than the ordinary light load.

A further object of the invention is to provide a novel form of shock absorber which shall be operative irrespective of leakage of air or pressure fluid from the chamber thereof, and in which the tendency or danger of leakage is reduced to minimum.

With these and other objects in view the invention comprises the various features hereinafter more fully described and defined in the claims.

The invention is illustrated in its preferred embodiment in the accompanying drawings, in which:

Fig. 1 is a view in elevation, partly in section, of my improved shock absorber;

Fig. 2 is a plan view of an annular ring or spring-retaining means in the shock absorber;

Fig. 3 is a sectional view taken on the line 3—3 of Fig. 2;

Fig. 4 is a plan view of another spring-retaining means which serves also as a packing follower;

Fig. 5 is a cross-sectional view taken on the line 5—5 of Fig. 4; and

Fig. 6 is a view in perspective showing the manner in which the shock absorber is attached to the chassis and leaf spring of a motor vehicle.

Referring more in detail to the drawings, the numeral 1 indicates a housing or casing which is attached to an inner sleeve 2 of the shock absorber, preferably by means of a screw-threaded connection 3 at the top of the casing. The inner sleeve 2 is preferably formed integrally with a hollow cap member or head 4 having a flanged portion or shoulder 5, against which the upper edge of the casing 1 abuts when screwed into place. In the top of the head 4 is an inflating valve of the usual form which may be protected by a dust cap 6 adapted to be screwed into place over the valve member. The casing 1 may be secured or connected by any suitable attaching means, such as a bracket 7, as shown in Fig. 6, to the chassis of the motor vehicle.

Between the casing 1 and the inner sleeve 2 is a slidable outer sleeve 8 which is preferably connected to a leaf spring 9, and is adapted to slide so as to compress or expand the air in the air chamber 10, thereby cushioning the movements of the vehicle. Connected to the outer or sliding sleeve 8 is a piston 11, which is connected thereto by means of a piston rod 12. The piston 11 which substantially fits within the inner sleeve member 2 is provided with a piston packing or washer 13 which may be maintained in place by means of a follower 14. Attached to the piston rod 12 is a second piston 15 which serves with the follower 16 to hold a center piston packing 17 in place around the piston rod. The piston packing 13 is preferably mounted so as to turn downwardly at its periphery, whereas the piston packing 17 is turned upwardly thereby making a tight joint between the piston and the interior bore of the inner sleeve 2. Over the piston 15 is a second washer 18 which is mounted in substantially the same manner as the washer 17, being held in place by means of a follower 19, the latter serving also as a spring-retaining member to hold one or more springs in place above the piston unit. The pistons and washers together with the followers mounted on the piston rod 12 are held in place thereon between a shoulder 20 on the piston rod and a nut 21 over the spring-retaining member 19. In order to provide cushioning action in the device which is independent of the air pressure in the chamber 10, I preferably provide nested springs, such as spring members 22, 23, which may be mounted on the spring-retaining means 19 at the top of the piston unit and held in place at the upper portion of the chamber 10 by means of a spring-retaining member 24 which may be seated on a shoulder 25 in the cap 4 in the manner shown, whereby the ends of the springs are held in place. At the central portion of the spring-retaining member 25 is an opening 26 which serves to permit the passage of air or other fluid through the valve at the top of the head 4 into the chamber 10. At the periphery of the retaining member I preferably provide a flange 27 adapted to engage the top of the spring 22 so as to prevent lateral movement thereof; at an intermediate portion of the retaining member I provide a V-lip or a circular raised portion 28 which is wedge shaped in cross section, as shown more particularly in Fig. 3, thereby forming a groove or recess for the spring 22, and a seating space for the spring 23 intermediate the opening 24 and the adjacent side of the projection 28 which serves to hold the spring 23 in place. The wedge-shaped circular projection 28 is preferably of a diameter slightly greater than the external diameter of the spring 23 and slightly less than the internal diameter of spring member 22. Upon the lower spring-retaining member 19 I preferably provide a wedge-shaped circular projection 29 having substantially the same diameter as the projection 28, thereby serving to hold the spring members 22 and 23 in place at the lower end of the chamber 10. It is obvious that I might employ a nest of three or more springs in place of the two springs shown, although for simplicity of construction I preferably employ only two springs as shown in the drawing.

At the lower end of the inner sleeve 2 is a packing retainer 30 which is preferably connected thereto by means of a screw-threaded connection 31, and serves to hold the packing 32 in place between the packing retainer 30 and the wall of the outer sleeve 8, the packing being preferably held in engagement therewith by means of a spring member 33 which presses outwardly against the packing, the spring member being retained in place by means of a washer 34 or other suitable holding means.

The lower end of the sleeve member 8 is preferably closed by an end portion 35 to which the lower end of the piston rod 12 may be connected so that the piston unit and rod 12 may move with the sliding movements of the sleeve member 8. The piston rod 12 may be attached to the end portion 35 by means of any suitable connection such as by means of a nut 36 fitting a screw-threaded portion of the piston rod 12. Any suitable form of connection may be employed for connecting the outer sleeve 8 to the leaf spring 9 of a motor vehicle, although I preferably employ a spring ball shackle 37 as shown in the drawings.

In order to assist in the cushioning action of the downward or return stroke of the piston 11 after the air and spring in the chamber 10 have been compressed, I preferably employ a heavy lubricating oil in the chamber 38 below the piston 11, whereby as the piston 11 and the end 35 move upwardly relatively to the casing 1 the oil is forced upwardly through the central opening in the packing retainer 30 whereas in the reverse movement the oil passes therethrough in the opposite direction thus assisting in the cushioning action. The oil employed in the device may be injected through a suitable opening 40 in the member 35, an amount being employed so that the chamber 38 below the piston 11 is substantially filled, and the oil passes upwardly through openings 39 in the piston 11 being forced by the followers and up over the piston 15 so as to form a film of oil on the top of the washer 18 which serves as a seal to prevent escape of air from the chamber 10 to below the piston 11.

The device may be assembled as follows:
After the outer sleeve member 8 has been attached to the piston unit through the piston rod 12, and the springs 22, 23 have been put in place upon the spring-retaining member 19, the outer casing 1 with the retaining member 24 in position is placed thereover in a manner such that the springs and pistons pass within the inner sleeve member 2 and the outer sleeve 8 passes between the inner sleeve and the outer casing, as shown in the drawing. As the springs 22, 23 move into place in the chamber 10 the upper ends engage the spring retainer 24, the outer spring 22 passing into the groove between the shoulder 27 and the V-shaped circular projection 28, whereas the spring member 23 engages the surface of the spring-retaining member between the projection 28 and the central opening 26, whereby the spring members are securely held in place between the retaining members 24 and 19. The device is then collapsed and oil is forced through a plug or opening 40 until the oil passes through the openings 39 in the piston 11 and follower 14 and squeezes by the pistons and washers connected thereto, passing into the chamber 10. The plug 40 is then closed and oil may then be passed through the cup 41 into the space between the casing 1 and inner sleeve 2 so as to permit free sliding movement of the sleeve 8. Air is then passed into the device through the valve in the cap 4 until the desired pressure is attained giving the proper riding position of the vehicle. The shock absorber will then operate to cushion the movements and prevent vibrations of the vehicle to which it is attached. The buoyancy effect of the shock absorber is obtained through both the pressure of air and the force of the spring members, whereby a lower air pressure may be used than is required in shock absorbers of the usual form.

The position of the springs in the chamber 10 may be so adjusted that under normal or initial load the force exerted by the springs may be any predetermined amount, and the size of the springs may be so chosen that the maximum deflection of the springs will not be reached by the application of the maximum load to be carried. The springs are preferably designed and positioned so as to exert only a comparatively small pressure on the piston under normal load conditions, but adapted on reduction of the fluid pressure in the cylinder through leakage or otherwise to carry its proportional part of the weight of the vehicle. It is apparent therefore that with sub-normal inflations or with loads greater than the normal weight to be carried, the spring members will carry a proportionately greater load, whereby cushioning action is obtained to prevent undue recoil or oscillating effects under all conditions. The fluid pressure carried by the cylinders is comparatively low so as to prevent leakage from the cylinders. It is obvious that an advantageous balance may be obtained between the spring action and the cushioning effect of the air for the reason that air or other pressure fluid follows the well known law of gases, whereby the pressure is doubled for example when the gas is compressed into one half of its initial volume. The force exerted by a spring however depends upon the size of the particular spring, although with a given spring the force exerted is directly proportional to its deflection from the position at which the spring is neither under tension nor compression. It is apparent therefore that the force exerted by the combination of air pressure and spring pressure with any given deflection may be predetermined so as to attain a maximum cushioning effect under varying loads and may be accomplished without danger of air leakage from the cylinders. With the auxiliary springs the vehicles or cars ride and function the same whether loaded or unloaded.

The size and tension of the springs, moreover, may, if desired, be such that should the device become deflated, the force of the springs between the piston and the upper part of the chamber 19 would be sufficient to prevent shocks which would otherwise occur when the shock absorber is deflated.

It is to be understood that various changes or modifications may be made in the device described without departing from the spirit or scope of the invention as defined in the claims.

I claim:

1. A device for absorbing the shock caused by the quick relative movement of two members comprising a cylinder fixed to one of the members, a piston associated with the other member and arranged to be moved in the cylinder by a relative movement of the members, the piston having a cup-shaped member rigid therewith and adapted to surround the cylinder, the space within the cylinder above the piston being filled with a compressible fluid, a liquid seal above the piston, the space beneath the piston within the cup-shaped member being filled with the liquid used in the seal, and a spring extending between the piston and the cylinder head, whereby movement of the piston inwardly of the cylinder is resisted by the spring in conjunction with the increased pressure of the fluid above the piston, the increased compression of the spring and the dash pot action of the piston and cylinder forcing some of the oil from beneath the piston to the space above it and whereby, if the pressure of the compressible fluid falls below normal, the weight on the absorber will be supported by the springs and shocks absorbed by the last two named agencies.

2. A device for absorbing the shock caused by the quick relative movement of two members comprising a piston-cylinder unit, means for connecting the piston and cylinder to the two members respectively, the space between the piston and the head of the cylinder being filled with a compressible fluid normally under superatmospheric pressure, a liquid seal above the piston to prevent the escape of said fluid, and spring means within the cylinder adapted normally to assist the compressible fluid in cushioning and absorbing shocks and also adapted to function alone in the event that the pressure of said fluid falls below normal.

3. A device for absorbing the shock caused by the quick relative movement of two members comprising a piston-cylinder unit, means for connecting the piston and cylinder to the two members respectively, the space between the piston and the head of the cylinder being filled with a compressible fluid normally under superatmospheric pressure, a liquid seal above the piston to prevent the escape of said fluid, two concentrically arranged springs between the piston and the cylinder head, and a cup-shaped member fixed to the piston and adapted to telescope with the cylinder, the cup-shaped member being completely filled with the liquid used in the seal, and the shocks being absorbed by the combined action of the compressible fluid, the springs and said liquid, the latter being used in connection with a dash pot action on movement of the parts in either direction.

Signed by me at Lowell, Mass., this 16 day of October, 1926.

JOHN A. STEVENS.